Nov. 23, 1965  H. E. HALL, JR  3,219,820
RADIOACTIVITY WELL LOGGING FOR DETECTING HYDROGEN AND CHLORINE
Filed June 15, 1959  3 Sheets-Sheet 1

3,219,820
RADIOACTIVITY WELL LOGGING FOR DETECTING HYDROGEN AND CHLORINE
Hugh E. Hall, Jr., Houston, Tex., assignor to Texaco Inc., New York, N.Y., a corporation of Delaware
Filed June 15, 1959, Ser. No. 820,236
18 Claims. (Cl. 250—83.3)

The present invention relates generally to the determination of the nature of earth formations; and, more particularly it is concerned with the analysis of earth formations along the traverse of a bore hole through irradiation of the formations with neutrons in order to produce certain observable effects that are detected as an indication of the nature of the formations. Accordingly, it is a general object of the present invention to provide improvements in radioactivity well logging wherein a source of neutrons is employed to produce observable effects indicative of the nature of the earth formations along the well bore.

The invention is especially directed toward improvements in neutron well logging for quantitatively determining in situ the presence of hydrocarbon oil or salt water in earth formations traversed by a bore hole. Accordingly, it is a more particular object of the present invention to provide improvements in radioactivity well logging wherein a source of neutrons is employed to produce observable effects which are detected and measured as an indication of the presence of oil or salt water in the earth formations along the well bore.

It is well known to analyze earth formations in situ along the traverse of a bore hole through the use of various radioactivity analysis techniques. For example, it is possible to determine the presence of porous zones along the path of the bore hole through the use of techniques that may indicate the presence or absence of hydrogen in the pores of the formation, which hydrogen may be present in hydrocarbon oil or water. Such analysis may be carried on through the use of neutron-neutron or neutron-gamma logs in accordance with known techniques. Further, in accordance with the prior art, it has been proposed to determine whether or not salt water is present in the formations along the traverse of an earth bore by analyzing for the presence of chlorine as a constituent thereof. This may be accomplished as set forth in United States Patent No. 2,752,504, issued June 26, 1956, to Alexander S. McKay, and reissued on October 29, 1957, as Reissue No. 24,383. In accordance with the referenced patent, a formation to be analyzed is bombarded with neutrons and neutron-capture gamma rays having a characteristic energy level are detected as an indication of the presence of chlorine in the formation. This patent further discloses measurement of neutron capture gamma rays having an energy level characteristic of hydrogen in order to provide a hydrogen log for correlation with the chlorine log. By comparing the hydrogen and chlorine logs the oil versus salt water content of the formation may be evaluated.

It is an object of the present invention to provide improvements in the methods and apparatus disclosed in the aforementioned Reissue Patent of Alexander S. McKay. It is another object of the present invention to provide improved well logging apparatus directed toward simultaneous determination of the porosity and chlorine contents of earth formations traversed by a bore hole.

It is still another object of the present invention to provide improved methods and apparatus for quantitatively distinguishing between hydrocarbon oil and salt water contained in the pores of an earth formation traversed by a bore hole and which is relatively insensitive to the adverse effect of certain other interfering substances which may also be present in the earth formations.

Briefly stated, one aspect of the present invention involves an improved method of radioactivity well logging wherein a source of neutrons is passed through a bore hole to irradiate the formations traversed by the bore hole and wherein radiation primarily indicative of chlorine as well as hydrogen is detected to provide a first signal and radiation primarily indicative of hydrogen to the substantial exclusion of chlorine is also detected to provide a second signal and wherein the two signals are plotted in correlation with the position of the logging instrument in the bore hole in such manner that differences between the two signals provide a quantitative measure of the chlorine content of the formation and corresponding variations in the two signals provide a quantitative indication of the hydrogen content in the formation.

A preferred aspect of the invention involves the use of improved apparatus for conducting such a method and which apparatus involves an elongated instrument housing formed of ferrous metal and containing a neutron source. Spaced a predetermined distance from the source along the longitudinal axis of the instrument, there is provided a first radiation detection unit comprising a radiation detector having its active volume substantially surrounded by a thin layer of cadmium. A second detection unit is also provided in the instrument spaced a predetermined distance from the source. Surrounding the instrument housing in the vicinity of the second detector, there is provided a layer of material having a relatively high capture cross-section for neutrons and characterized by having a relatively insignificant attendant gamma ray response upon the capture of a thermal neutron. Means are further provided for maintaining the position of the logging instrument in relatively fixed relation to the sides of the bore hole during the course of the logging run.

A further aspect of the invention involves the use of a critical spacing arrangement relative to the neutron source and the respective detectors in order to overcome the adverse influence of certain bore hole constituents upon the quantitative determination of the oil-water content of the earth formations analyzed by the well log.

For additional objects and advantages and for a better understanding of the invention, attention is now directed to the following description and accompanying drawings. The features of the invention which are believed to be novel are particularly pointed out in the appended claims.

Figure 1:
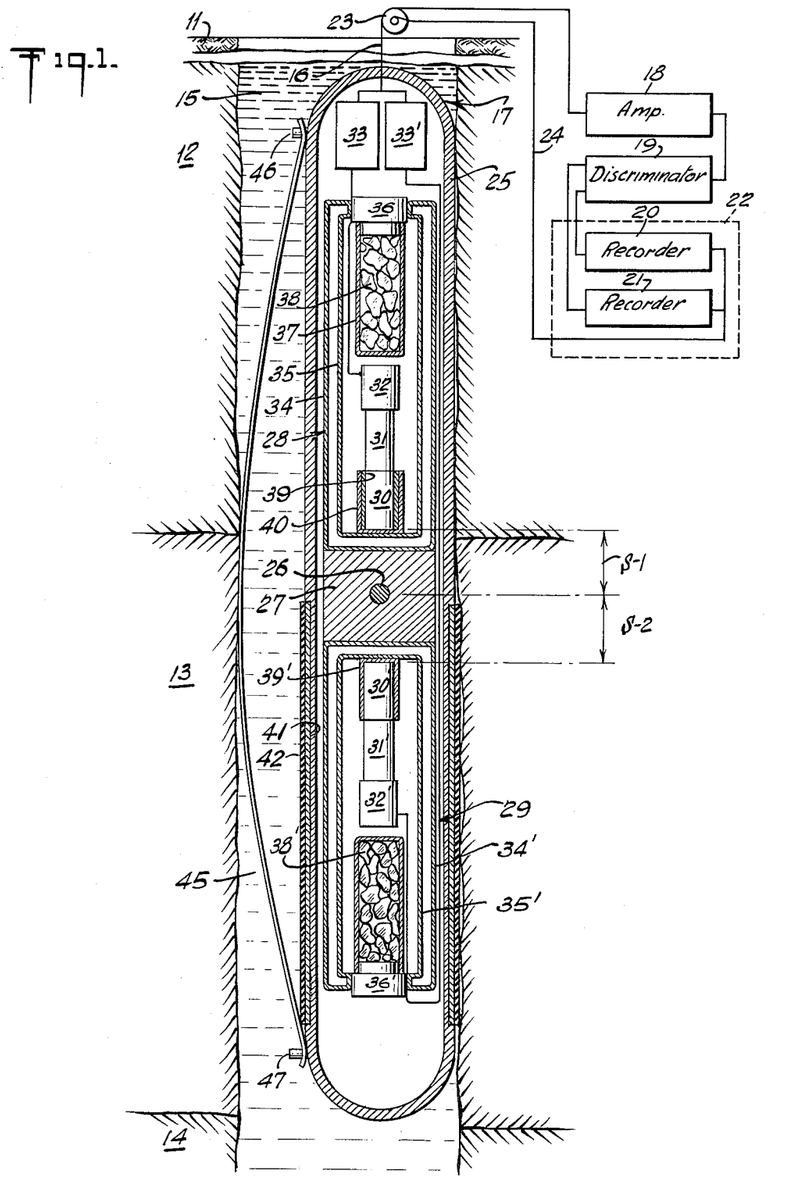
FIGURE 1 is a schematic representation showing a vertical elevation through a portion of a bore hole having a well logging instrument suspended therein and which is constructed in accordance with principles of the invention.

Referring now to FIG. 1 of the drawings, there is shown a bore hole 10 traversing a plurality of earth formations 11, 12, 13 and 14 and containing a fluid, such as salt water, or crude oil, for example. Suspended within the bore hole 10, as by means of a cable 16, there is shown a well logging instrument 17 constructed in accordance with the principles of the invention. The cable 16 may include an outer conductive sheath together with one or more additional inner conductors (not individually shown) in order to afford means for transmitting electrical signals between the instrument 17 and electrical apparatus at the surface of the earth. The surface equipment provides means for receiving signals transmitted from the logging instrument 16 and amplifying and segregating the received signals as necessary for recording purposes. The surface apparatus includes an amplifier 18 having its output side connected to a multi-channel pulse-height analyzer or discriminator 19. One output path from the discriminator 19 leads to a first display device in the form of a recorder 20 and the other output path from the discriminator 19 leads to a second display device in the form of a recorder 21. It is to be understood that the two recording devices may be separate recorders; however, they preferably comprise separate channels of a multi-channel recorder, as indicated by the dashed box 22 enclosing recording devices 20, 21. In any event, the recorders 20, 21 include ratemeter circuitry as necessary for providing a record of the intensity, i.e., rate-of-occurrence of detected radiation. It is also to be understood that although the discriminator 19 is shown as part of the surface equipment, it may preferably be included as part of the equipment within the logging instrument 16.

In order to correlate the position of the logging instrument 17 in the bore hole 10 during the well log, there is provided at the surface a measuring apparatus 23, represented diagrammatically as a wheel having its perimeter in contact with the cable 16, for sensing movements of the cable 16 in and out of the bore hole 10. The measuring apparatus 23 may be any known device of this type suitable for determining the position of the logging instrument 17 in the bore hole 10 and may advantageously be of the type which provides an electrical output signal which may be transmitted as by means of the conductive circuit 24 to the recorders 20, 21 for correlating the recorded logging signal with the position of the logging instrument in the bore hole throughout the well log.

The logging instrument 17 comprises an elongated outer shell-like housing or casing 25 formed conventionally of steel in accordance with known techniques to withstand the pressures and temperatures commonly encountered in the well logging art. Advantageously, the housing should be of such character as to withstand the conditions that may be found in bore holes upwards of ten or twenty thousand feet in depth.

The casing 25 contains a neutron source 26 for bombarding the earth formations along the bore hole together with appropriate radiation detection equipment for detecting gamma rays induced in the formation as the result of irradiation by the source. Appropriate electrical circuitry is also enclosed within the casing for amplifying and otherwise handling the output signals from the radiation detection equipment for transmission over the cable 16 to the surface equipment. In particular, the neutron source 26 is shown positioned within the housing 25 and surrounded by a neutron-permeable shield 27 of lead or tungsten, for example, to prevent gamma radiation which may also be emitted thereby from passing either directly or indirectly to the detection equipment. In the upper end of the instrument 17, spaced a predetermined distance from the source 26, there is positioned a first radiation detection unit 28 which together with its associated circuitry is adapted and arranged to provide an output signal that is proportional to gamma radiation emitted from the adjacent earth formations as the result of interaction of neutrons from the source with hydrogen in the formation, while being substantially unaffected by the presence of chlorine in the formation, as discussed in detail below. The upper detection unit 28 is hereinafter referred to as the porosity detector or simply the hydrogen detector. Below the source 26, and spaced therefrom a predetermined distance, there is provided a second detection unit 29 which together with its associated circuitry is adapted and arranged to provide an output signal which is proportional to gamma radiation emitted from the formation as the result of neutrons from the source and which gamma radiation is proportional to both the hydrogen and chlorine content of the formation. For purposes of convenience, the second detection unit is hereinafter referred to as the hydrogen plus chlorine or simply the H+Cl detector.

The upper or hydrogen detector unit 28 comprises a scintillation detector including a gamma ray sensitive luminophor 30, advantageously in the form of a sodium iodide crystal, together with a photomultiplier tube 31 shown mounted adjacent the luminophor 30 for detecting the photon output pulses from the luminophor and providing an electrical signal proportional thereto. The photomultiplier tube is shown adjacent to a preamplifier 32 which, in turn, is shown electrically connected to additional electrical equipment identified as an amplifier 33 for transmission of an output signal derived from the photomultiplier tube 31 to the surface equipment by means of the cable 16. It is to be understood that the photomultiplier tube 31 is energized by means of a high voltage source (not shown) which may comprise batteries positioned in the logging instrument or, more conventionally, may involve the use of power supply equipment including a transformer and rectifier in the logging instrument for deriving appropriate high direct-current operating potential from electric power transmitted as alternating-current from the surface to the logging instrument in the bore hole. It is to be further understood that the amplifier 33 may actually include any additional circuitry required for handling the transmission of the signal information to the surface in accordance with principles well known in the art. For example, the radiation detector signals may be transmitted to the surface as amplitude modulated signals, or may be transmitted in the form of frequency modulated signals, in accordance with well known techniques. If a so-called single conductor cable is employed, the respective signal from the separate detector may be transmitted simultaneously as pulses of different polarity or as signal information on carriers of different frequency, for example. The luminophor 30 is shown mounted within a conventional aluminum container 39 which serves to protect it from moisture and physical damage. The upper end of the container 39 facing the photomultiplier 31 is also shown as open, with the luminophor 30 in direct contact with the photomultiplier 31. However, it is to be understood that the container 39 may be sealed with a transparent cover of glass or plastic in a manner known in the art. Surrounding the container 39 there is provided a thin layer 40 of a neutron absorbing material, such as cadmium, which emits a plurality of gamma radiations upon capturing a neutron and which, as hereinafter discussed, functions in combination with other elements of the invention to render the neutron-gamma ray signal derived by the hydrogen detector primarily sensitive to hydrogen and relatively insensitive to the effect of chlorine, as discussed in detail below.

In order to insure that the hydrogen detector is responsive to the hydrogen only and not the natural gamma radiation or scattered gamma radiation from the neutron source, the discriminator associated therewith should advantageously be biased to exclude these undesirable lower energy gamma rays. Preferably, the discriminator should be biased so that the measured radiation signal is indicative of gamma rays having an electron energy of about 1.8 million electron volts and above as will be discussed later. This particular bias level, in combination with the 2" x 4" sodium iodide crystal and a cadmium layer for the neutron absorbing material 40 which surrounds the luminophor 30 at a source-to-detector spacing of 16 inches operates to provide a very satisfactory logging signal which is primarily responsive to the hydrogen content of the formations, due to radiation resulting from irradiation of the formation by neutrons from the source 26. By thus biasing the detector to exclude lower energy gamma rays, most of the natural gamma radiation present in the formation and any gamma radiation scattered from the source is likely to be eliminated from the detected signal, since the natural and scattered gamma radiations are both of relatively low energy level.

In accordance with the so-called neutron-gamma ray logs, a source of neutrons is passed through the bore hole in order to irradiate the earth formations along the traverse of the bore hole. The neutrons from the source are slowed down in the formation and bore hole fluid, primarily due to the effect of hydrogen, and after being slowed to the thermal range the neutrons are captured by material of the formation with the resultant emission of gamma rays. These neutron-gamma rays which are detected and their intensity, i.e., rate-of-occurrence is measured as a measure of the hydrogen content of the formations.

When the thermalized neutrons are captured by hydrogen, gamma rays having a characteristic energy of 2.2 million electron volts are emitted by the hydrogen responsible for the capture. When only hydrogen is present in the pores of the region under investigation, the intensity, i.e., rate-of-occurrence of the detected gamma radiation provides a good quantitative indication of the hydrogen content of the formation. However, it has been determined that other materials which may also be present in the formation can have an adverse effect on the neutron-gamma ray well log and which may render the log unreliable as a hydrogen measurement. Of particular significance is the presence of chlorine which has a relatively high capture cross-section for thermal neutrons, as compared with that of hydrogen. In particular, chlorine has a neutron capture cross-section of about 32 Barns, whereas hydrogen has a neutron capture cross-section of about .33 Barns. Thus, chlorine is approximately 100 times more effective in capturing thermal neutrons than hydrogen. When a thermal neutron is captured by chlorine, rather than hydrogen, about 3.1 gamma rays (on the average) are emitted per capture as compared with one gamma ray per capture by a hydrogen atom. In addition to the foregoing, many of the gamma rays emitted by chlorine are of higher energy range, from about 4–8 mev., than the characteristic 2.2 mev. gamma rays of capture emitted by hydrogen. In view of the foregoing the pressence of even a small amount of chlorine will ordinarily increase the intensity of the gamma radiation detected by the neturon-gamma ray instrument, thus giving a false indication of hydrogen content in the resultant log.

The neutralization of the adverse effect of chlorine upon the neutron gamma ray well log described above is accomplished by subjecting the gamma ray detector to radiation which varies inversely with the effect upon the detector due to the presence of chlorine. Chlorine has a relatively high capture cross-section and omits a plurality of gamma rays in response to the capture of each neutron. Thus, the counting rate of the gamma ray detector is increased due to the presence of chlorine. In order to neutralize the effect of chlorine a gamma ray signal is developed whose intensity decreases correspondingly due to the presence of chlorine. This may be accomplished by developing a gamma ray signal whose intensity is proportional to the thermal neutron flux in the vicinity of the detector. This is due to the fact that chlorine absorbs or removes thermal neutrons from the environment of the detector due to its relatively high capture cross-section. Thus, the thermal neutron flux in the vicinity of the detector is reduced due to the presence of chlorine. By introducing a neutron-absorbing material which emits a plurality of neutron capture gamma radiations in the vicinity of the detector, thermal neutrons are absorbed in said material which result in the emission of gamma radiation which is detected by the gamma ray detector. Using a sodium iodide detector, the thickness of cadmium needs to be at least enough to absorb most of the thermal neutrons and the balance is achieved by adjusting the discriminator bias. When the logging instrument passes into a region containing chlorine from an identical region with the exception that no chlorine is present, the counting rate of the gamma ray detector tends to increase due to the increase of the number of capture gamma rays directly attributable to the chlorine. However, when this occurs, the number of thermal neutrons available for capture by the neutron absorbing material around the detector is reduced thus tending to decrease the counting rate in the gamma ray detector. By suitable means, these two effects may be made to cancel one another, so that when a logging tool using this system is passed from a formation containing chlorine to one not containing chlorine but have the same porosity, formation matrix, and hydrogen content, the response remains constant.

In the apparatus shown in FIG. 1, the above-mentioned two effects may be made equal and opposite either by adjusting the bias of the discriminator, by adjustment of the amount of the neutron absorbing material 40, or by a combination of the first two techniques. For example, the neutron absorbing material 40 may be a sheet of cadmium surrounding the crystal at such a thickness, i.e., .025", that it essentially captures all of the thermal neutrons which diffuse to the layer of cadmium. The rise in the capture gamma component may be balanced against the thermal neutron component by a discriminator setting of approximately 1.8 mev. for a source-to-detector spacing of 16". The discriminator bias will be in the range from 1.0 to 2.5 mev. depending upon the detector-to-source spacing, the dimension of the crystal would not become activated. This aspect diameter of the bore hole and the salinity of the fluid.

At lower bias settings, there is more thermal neutron component than is necessary, and at higher bias settings there is less than is needed. Thus, in accordance with one aspect of the invention the bias may be set, for example, at 1.0 mev. and the thickness of cadmium adjusted so that the two effects cancel. If this were done, one would wish to place an additional neutron absorbing material between the crystal and the cadmium, such as boron or lithium, sufficiently thick to absorb the thermal neutrons transmitted through the cadmium. This would be desirable since neither boron nor lithium emit neutron capture gamma rays above 1.0 mev. and the crystal would not become actviated. This aspect may be carried out with the hydrogen detector of FIG. 1 by the addition of a layer of neutron capturing material, such as boron, between the neutron interaction material 40 and the luminophor 30.

While cadmium is preferred as the material for capturing the thermal neutrons in the vicinity of the detector in order to neutralize the effect of chlorine upon the neutron gamma ray log, it is to be understood that other materials may be employed rather than cadmium and that other materials may be employed together with cadmium. In the present case, where the cadmium is employed in a logging instrument having a steel instrument casing or housing, the iron of the logging instrument actually cooperates with the cadmium. Iron has a much lower capture cross-section for neutrons than cadmium, however, there is a relatively large quantity of iron present in the vicinity of the detector, hence, its effect is similar to that of the cadmium. Iron has a thermal neutron capture cross-section of 2.43 Barns compared with a capture cross-section of about 3500 Barns for cadmium. Iron emits neutron capture gamma rays ranging up to 9.3 mev., whereas cadmium emits gammas up to 9.05 mev. upon capture of thermal neutrons. Gadolinium may also be employed in carrying out the invention. Gadolinium has a capture cross-section of 36,300 Barns and emits neutron capture gammas up to 7.78 mev. As mentioned above, chlorine, the effect of which is to be balanced out of the resultant detected gamma ray signal, has a capture cross-section of about 32 Barns and produces neutron capture gamma rays up to about 8.56 mev.

Whether cadmium or other material having similar characteristics or a combination of such materials is employed, such as the combination of cadmium with the steel logging casing, it is important that the sum total of such material used have a predetermined net effect which results in the development of a gamma ray signal in response to the thermal neutron population in the immediate vicinity of the detector which just cancels out the capture gamma effect due to the presence of chlorine in the bore hole and formation in the vicinity of the detector.

In a preferred embodiment employing a neutron source comprising 200 mc. of Ra:Be, a sodium iodide crystal radiation detector of 4" length and 2" diameter biased at 1.8 mev., and having its near side spaced from the neutron source a distance of 16", it has been found that with a steel logging casing having a thickness of $\frac{5}{16}$", a cadmium sleeve greater than 10 mils in thickness provides very satisfactory cancellation of the adverse effects of chlorine on the neutron-gamma ray log in formations having average ranges of porosity and salinity which are 10–30% porosity and salinities from zero to saturation.

In order to stabilize and protect the scintillation logging equipment against the effects of high bore hole temperatures and variations thereof, the luminophor 30 and photomultiplier tube 31, as well as the preamplifier, are all shown mounted within an insulated chamber preferably in the form of a Dewar flask comprising an outer wall 34 separated from an inner wall 35 by an evacuated space. The insulating chamber is provided with an appropriate removable insulating cover plug 36. Within the Dewar flask, advantageously affixed to the inside of the insulated cover plug 36, there is provided a coolant chamber 37 having thermally conductive walls as of thin aluminum and containing a quantity of ice 38. The coolant chamber including the ice 38 affords means for maintaining the scintillation detection equipment in a stable, low temperature environment by virtue of the temperature stability afforded as the ice undergoes a change of state from the solid to the liquid phase during the logging operation. It is to be understood that other techniques for stabilizing the temperature of the instrument may be employed, for example, as shown and described in U.S. Letters Patent No. 2,824,233, granted February 18, 1958, to Gerhard Herzog.

The lower or hydrogen plus chlorine detector 29 is substantially like the upper or hydrogen detector 28 and similar elements bear corresponding reference numerals having a primed designation. However, the H+Cl detector 29 is not made insensitive to chlorine as in the case of the hydrogen detector 28, instead, its sensitivity to chlorine is enhanced. In particular, the luminophor 28' of the H+Cl detector 29 differs from the luminophor 28 of the hydrogen detector in that it is not provided with a surrounding layer of cadmium. The H+Cl detector 29 further differs from the hydrogen detector 28 in that the portion of the logging housing 25 in the vicinity of the luminophor 30' is surrounded with a layer of material having a relatively high thermal neutron capture cross-section and which is further characterized in that it has relatively insignificant high energy gamma ray emission characteristics in response to the capture of a thermal neutron. Advantageously, this material comprises boron or a boron compound in admixture with a suitable binder. One embodiment of the invention, as illustrated in FIG. 1, involves the use of a layer of boron carbide 41 having a protective layer 42 of material such as neoprene surrounding it.

In order to enhance the sensitivity of the H+Cl detector 29 to chlorine, the discriminator circuitry associated therewith should be biased to eliminate gamma rays of 2.2 million electron volts which are characteristic of the capture of thermal neutrons by hydrogen. This may be accomplished by establishing the bias of the discriminator at about 3 million electron volts in order that the detected gamma rays will significantly indicate the higher energy gamma rays caused by the presence of chlorine in the formation irradiated by neutrons from the source 26.

Despite the elimination of the 2.2 mev. hydrogen capture gamma rays, it is to be understood that the gamma radiation detected by the H+Cl detector 29 will be proportional to the hydrogen content of the formation as well as the chlorine content. Fast neutrons from the source must be moderated, i.e., slowed to the thermal range, before being captured to cause emission of neutron induced gamma rays. The hydrogen sensitivity of the H+Cl detector is due to the fact that the hydrogen, which is the lightest of the elements, is primarily responsible for moderating or thermalizing the fast neutrons from the source. The chlorine sensitivity of the detector is due to the fact that the measured gamma ray flux is emitted primarily due to capture of the thermal neutron by chlorine.

In order to stabilize the position of the logging instrument throughout the logging run, there is provided a decentralizing bow spring 45 having its upper and lower ends 46 and 47 mounted to the logging instrument 17 in such manner that the spring is free to flex as the instrument is moved past irregularities in the side of the bore hole. Conventionally this may be achieved by mounting the upper and lower ends of the bow spring 45 in slidably engageable relationship to the instrument 17, as by means of elongated slots (not shown) in the bow spring 45.

In accordance with a preferred aspect of the invention for eliminating the adverse effects of an interfering material, such as boron or lithium, which has a significant capture cross-section for neutrons and which does not emit significant gamma radiation upon capturing a neutron, the spacing between the neutron source 26 and the respective detectors should differ by a predetermined amount. While the specific spacings may vary somewhat from about 3" to about 15" or higher, advantageously, it has been determined that with a 200 mg. radium-beryllium source or equivalent and luminophors of 4" in length and 2" in diameter, the spacing S–1 between the source 26 and the near end of the hydrogen luminophor 30 should be between 12 and 14 inches, with 12½ inches being preferred, while the spacing S–2 between the source 26 and the near end of the hydrogen luminophor 30' should be between 14 and 16 inches, with 14½ inches being found quite satisfactory. It is to be understood that the minimum source to detector spacings may be decreased somewhat and, especially with increased source strength, the maximum source to detector spacings may be increased somewhat; however, advantageously, for eliminating the adverse effect of boron upon the resultant logs, the spacing S–2 of the H+Cl luminophor 30' from the source 26 should exceed the spacing S–1 of the hydrogen luminophor 30 from the source 26 by a distance of 1 to 6 inches and preferably from 2 to 3 inches.

In order to conduct a radioactivity well log for determining quantitatively as well as qualitatively the hydrogen and chlorine contents of earth formations traversed by the bore hole, the percentage salinity of the water contained in the well bore and formations should preferably be determined, either by the taking of samples or at least by reference to some previously determined information indicating the expected salinity. The salinity information provides reference data for adjusting logging equipment and for evaluating the logging record which is obtained.

The logging instrument may be calibrated for a well having a given chlorine saturation by positioning the logging instrument opposite a zone in the formation known to be 100% saturated with water, or some other known fraction thereof, and noting the measured radiation response. Advantageously, the response then may be adjusted to some desired position on the chart. Similarly, the instrument should be positioned opposite a zone in the formation having 100% oil saturation, or some known percentage thereof, preferably the same percentage as that chosen for the calibration of the salt water response, and the instrument should then be adjusted so that the logging chart indicates a desired value. Advantageously, to facilitate interpretation, the sensitivities of the logging equipment should be adjusted so that the H+Cl signal and the hydrogen or porosity signal track in oil saturated formation of varying porosities. This assures that both the hydrogen detection equipment and the hydrogen plus chlorine detection equipment are substantially equally sensitive to hydrogen content, whether present as a constituent of oil or water. Then, with the instrument positioned opposite a zone containing salt water, any difference between signals indicated by the H+Cl detector and the hydrogen detector will be due to the presence of chlorine as a constituent of salt water. With the apparatus thus calibrated, the indicated hydrogen or porosity signal shows the oil or water content of the formation, while any separation or deviation between the porosity signal and the signal of the H+Cl detector indicates that the signal is due to salt water to an extent proportional to the deviation between he two signals. When the porosity signal indicates a high concentration of hydrogen while the chlorine signal is substantially coincident therewith, there is a good indication that oil is present in the formation and the exact quantity thereof is also shown. When the hydrogen or porosity signal indicates a high value, but with the H+Cl signal being widely separated therefrom, there is provided an indication that the formation is largely filled with salt water, with the degree of separation between the two signals indicating the quantity of salt water in relation to the total saturation.

Figure 3:
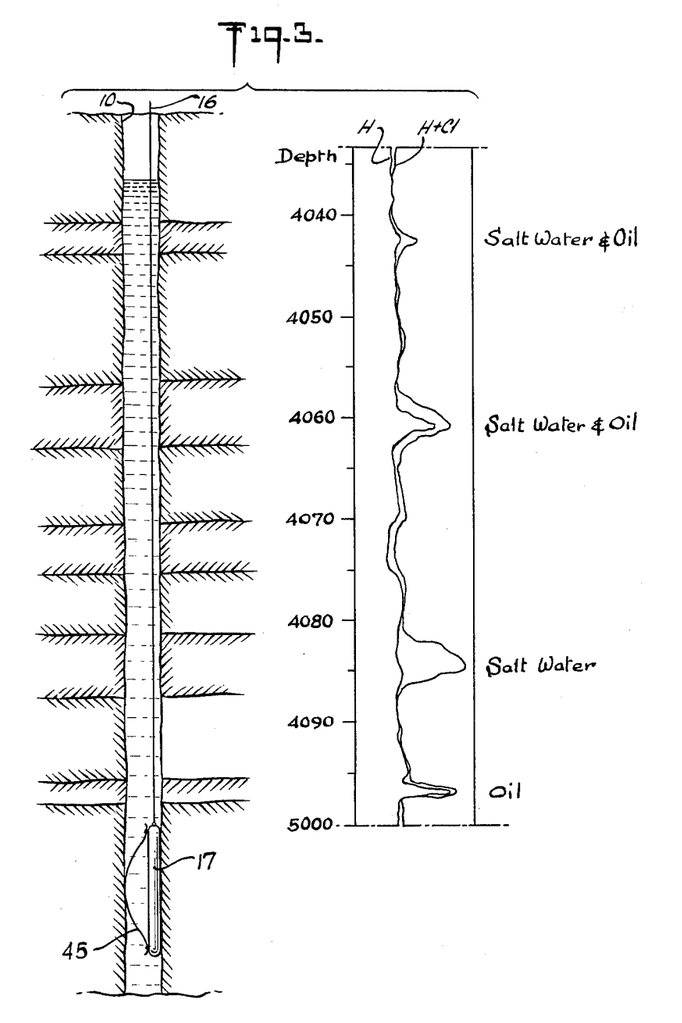

Referring now to FIG. 3, there is shown a cross-section of a bore hole traversing a plurality of earth formations and showing suspended therein a logging instrument 17 in accordance with the invention, such as that shown in FIG. 1. Plotted alongside the diagram of the bore hole and earth formations there is shown a typical logging record of the adjacent earth formations made by the instrument 17. This record shows a first trace H showing radiation intensity of the hydrogen detector (increasing to the right as seen in the record) and representative of the hydrogen content of the formation and a second trace H+Cl showing radiation intensity of the hydrogen+chlorine detector (also increasing to the right as seen in the record) and indicative of both the hydrogen and chlorine contents of the earth formations. The response of the H trace indicates the quantity of hydrogen, i.e., porosity of the formation. Regions of corresponding deviations of the two traces indicate the presence of oil or fresh water and regions where the H+Cl signal exceeds the H signal indicate the presence of salt water. Thus, in the region just below 4095 feet there is an indication of oil, or possibly fresh water. In the region just below 4080 feet there is an indication of salt water saturation. In the region just below 4060 feet there is an indication which may be interpreted as a mixture of both salt water and oil. In the region just below 4040 feet there is an indication of the presence of oil and salt water.

Although the two logging signals indicating the hydrogen content and hydrogen+chlorine content, respectively, are shown recorded on the same chart, it is to be understood that they may be recorded as individual traces on separate logging charts, with the two records being interpreted by overlaying one with respect to the other in order that corresponding variations and differences between the respective logs may be interpreted. In such case it is to be understood that the logging system should be adjusted so that the two logging signals show deviations on the same scale of values.

It is also contemplated that, instead of recording both the hydrogen and the hydrogen-plus-chlorine signals individually, only one of the two signals, preferably the hydrogen content signal, may be recorded together with a second correlated signal showing the ratio or difference between the hydrogen and hydrogen-plus-chlorine signals.

It is also noted that the hydrogen content signal may be plotted versus the hydrogen-plus-chlorine content signal in which case a straight line indication will be given for oil or fresh water, with deviations therefrom indicating the chlorine content.

In order to conduct a logging run with the herein disclosed apparatus the instrument 17 is preferably lowered below the region of the well to be logged and drawn upwardly through the well at a predetermined constant rate while the outputs of the two detector units 28 and 29 are transmitted over the cable 16 to the surface equipment where they are channeled according to amplitude to the appropriate recording device. The intensity, i.e., rate-of-occurrence of the detected radiation in each of the two channels is recorded in correlation with the location of the logging instrument in the bore hole.

Figure 2:
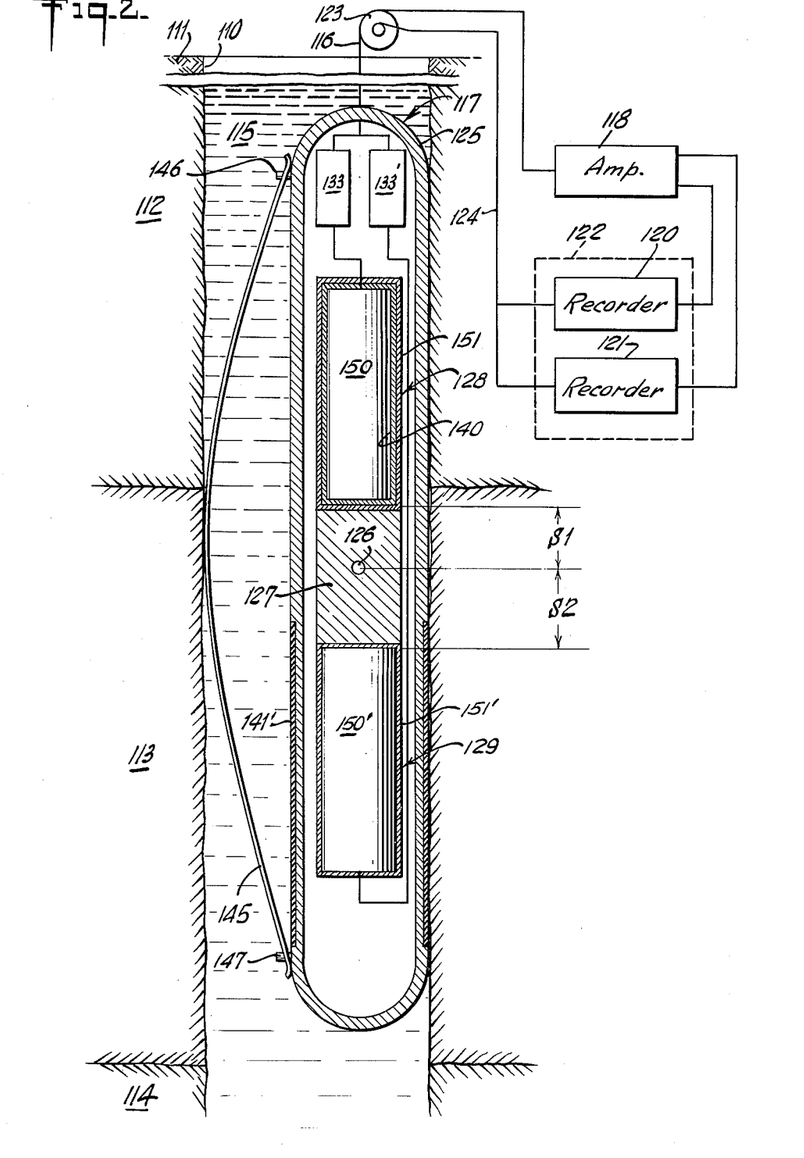
FIGURE 2 is a schematic representation similar to FIG. 1 showing another form of logging apparatus embodying principles of the invention; and, FIGURE 3 is a diagrammatic representation of a typical logging record which may be made in accordance with the teaching of the present invention.

Referring now to FIG. 2, there is shown another embodiment of the invention wherein elements corresponding to those of the apparatus shown in FIG. 1 are identified with reference numerals having a value of 100 plus the value of the numeral applied to the corresponding element of FIG. 1. Thus, for example, the bore hole 10 and formations 10–14 of FIG. 1 correspond to the bore hole 110 and the formations 111–114 of FIG. 2.

Whereas the apparatus of FIG. 1 discloses gamma ray detection apparatus of the scintillation type, the detection apparatus of FIG. 2 involves the use of high efficiency electrical pulse-producing type detectors of the type disclosed in U.S. Patent No. 2,397,071 in the name of D. G. C. Hare. These detectors, which may for convenience be referred to as high efficiency multiple plate cathode type Geiger counters enable the construction of a very reliable neutron-gamma ray well logging instrument embodying principles of the invention and which affords certain advantages as compared with apparatus involving scintillation type detectors.

In particular, the upper or hydrogen detector 128 of the logging instrument shown in FIG. 2 is in the form of a high efficiency multiple plate pulse counter 150 having a thin layer or sleeve of material 140 such as cadmium surrounding its active volume in order to render the signal of the hydrogen detector insensitive to chlorine, as discussed above with respect to the apparatus of FIG. 1. Surrounding both the counter 150 and cadmium sleeve 140 there is provided a lead sleeve 151 for shielding unwanted lower energy gamma radiation from the detector. It has been determined that the lead shield should comprise ¼" of lead or equivalent gamma ray shielding material when a radium-beryllium neutron source is employed.

In the apparatus shown in FIG. 2, the gamma radiation detector is sensitive to gamma radiation having energies above a few kev. Therefore, in order to make this log insensitive to the chlorine content in the volume surrounding the detector, the capture gamma component of the response may be balanced against the thermal neutron component only by varying the amount of neutron absorbing material 140 in the vicinity of the detector. Various neutron absorbing materials 140 may be used as previously discussed. For example, a sheet of cadmium sufficiently thick to capture all of the thermal neutrons which get to the cadmium, placed around a 2" x 4" gamma radiation detector as previously described, over compensates or, in other words, introduces a thermal neutron component in the response which is too large. The amount of cadmium may be reduced slightly, i.e., by cutting holes in it to afford the correct degree of compensation. To afford the correct degree of compensation, approximately 25% of the thick cadmium sheet should be removed by cutting small holes uniformly spaced over the detector. Alternatively one could reduce the thickness of the cadmium sheet to approximately .004" to accomplish the same purpose.

The lower or hydrogen plus chlorine detector 129 is likewise a high efficiency multiple plate pulse type counter 150'. This counter 150' also is provided with a lead shielding sleeve 151' corresponding to the shield 151 around the upper counter 150. However, since this counter 150' is designed to be sensitive to chlorine, as well as hydrogen, it is not provided with a cadmium sleeve, as in the case of the upper or hydrogen counter 150.

Generally like the logging instrument shown in FIG. 1, there is provided a layer 141' of boron carbide surrounding the outside surface of the logging instrument in the vicinity of the H+Cl detector. Unlike the apparatus of FIG. 1, however, and in accordance with a further and preferred novel aspect of the invention which may also be applied to the apparatus of FIG. 1, the outer layer 141' of neutron capturing material specifically illustrated in FIG. 2 comprises boron carbide with an epoxy resin binder. Not only does this novel and improved material provide an effective thermal neutron shielding material for carrying out the logging technique of the present invention but use of this specific shielding material enables the logging casing 125 to be undercut in the vicinity of the detector 129, thus reducing the outside diameter of the logging instrument as compared with the use of a boron carbide layer covered with a protective layer such as neoprene as shown in FIG. 1. A ⅛" thick coating has been found very satisfactory. By undercutting the tool casing ⅛" the coated portion of the instrument is rendered flush with the rest of the instrument. The boron carbide in cooperation with the epoxy resin binder provides a very abrasion-resistant coating for the instrument. It is substantially unaffected by the pressures, fluids and temperatures encountered in deep bore holes and results in a more serviceable, longer lasting instrument structure which is less likely to become jammed or stuck in a bore hole. When it is realized that well logging instruments are customarily suspended upon cables and lowered into narrow bore hole distances of two, three, or four miles into the earth, it will be appreciated that this feature represents a very important improvement.

The boron carbide in the epoxy resin binder or matrix may advantageously be prepared by mixing powdered boron carbide into liquid epoxy resin to form a paste which may be applied to the steel logging instrument.

As discussed above, in order to eliminate the adverse effect of boron in the earth formations upon the oil-water log conducted with the apparatus of the present invention, it has been determined that the source-detector spacing of the H+Cl detector should be longer than the spacing between the source and the hydrogen detector. Utilizing two high efficiency multiple plate Geiger counters 14" long and 2" in diameter, both of which were equipped with steel cathode plates, it was found that with the hydrogen detector spaced 7½" from the source, the H+Cl detector should be spaced 9½" from the source for optimum correction of the adverse effect of boron in the formation.

With the apparatus shown in FIG. 1 which utilizes scintillation counters in combination with discriminator apparatus, the neutron source may comprise a radium-beryllium source which emits significant lower energy gamma radiation along with the neutron radiation, or a substantially gamma-free neutron source such as actinium 227 and beryllium or radium D and beryllium. However, in the case of the apparatus shown in FIG. 2, it is preferable to use a neutron source whose gamma ray emission is at least as low as that of an actinium 227 and beryllium source or equivalent. This enables the use of ¼" lead shielding around the respective detectors to eliminate the relatively small amount of adverse lower-energy gamma radiation from the measured radiation signal.

In accordance with a further aspect of the herein disclosed invention, it is contemplated that the neutron interaction material in the vicinity of the neutron-gamma ray detector may be placed around the outside of the casing of the logging instrument in the vicinity of the detector, rather than inside the casing as shown in the drawings. For example, this aspect may advantageously be carried out by plating the outside of the logging instrument in the vicinity of the neutron-gamma ray detector with a predetermined quantity of cadmium in order to provide for effective neutralization of the effect of chlorine upon the neutron-gamma ray log, as discussed in detail hereinabove.

The said subject matter presented and claimed in this application is closely related to certain subject matter presented and claimed in the following copending applications Serial Nos. 820,237, now U.S. Patent No. 3,151,242, 820,239, now U.S. Patent No. 3,147,378, 820,240, now abandoned and 820,241.

Obviously many modifications and variations of the invention, as hereinbefore set forth, may be made without departing from the spirit and scope thereof, and therefore only such limitations should be imposed as are indicated in the appended claims.

I claim:

1. Apparatus for conducting a radioactivity well log comprising an elongated instrument housing formed of ferrous metal and adapted to be passed through a bore hole traversing a plurality of earth formations, said housing containing a source of fast neutrons, a first radiation detecting unit quantitatively sensitive to gamma rays returning to the bore hole as a result of irradiation of the formation by neutrons from the source and which is adapted and arranged to provide an output signal primarily indicative of the presence of hydrogen in said formation and substantially insensitive to the presence of chlorine, said first detecting unit comprising a gamma radiation detector and a predetermined quantity of a first neutron absorbing material positioned in the vicinity of said detector, said first neutron absorbing material being characterized by the emission of radiation to which the detector is sensitive in response to the absorption of neutron radiation, said detector being substantially unshielded with respect to said radiation emitted from said first neutron absorbing material such that said detector is exposed to at least a major portion of said radiation emitted from said first neutron absorbing material and traveling toward said detector, whereby said detector is rendered sensitive to both neutron-gamma radiation and thermal neutron radiation in the borehole resulting from said irradiation of the formation by neutrons, a second radiation detecting unit positioned within said housing and being adapted to provide a quantitative signal of gamma radiation returning to the bore hole as a result of irradiation by neutrons from the source and which gamma rays are indicative of both the hydrogen and chlorine content of the formations, and a layer of a second neutron absorbing material substantially surrounding the portion of the instrument housing in the vicinity of said second radiation detection unit, said second neutron absorbing material having a relatively insignificant gamma ray emission characterization in response to absorption of a neutron.

2. Apparatus according to claim 1 wherein the second neutron absorbing material is boron.

3. Apparatus according to claim 2 wherein the boron is a constituent of boron carbide in an epoxy resin binder.

4. Apparatus for conducting a radioactivity well log comprising an instrument housing adapted to be passed through a bore hole traversing a plurality of earth formations, said housing containing a source of neutrons, a first detecting unit quantitatively sensitive to gamma rays returning to the bore hole as a result of irradiation of the formation by neutrons from the source and which is adapted and arranged to provide an output signal primarily indicative of the presence of hydrogen in said formation, said first detecting units comprising a gamma radiation detector and a predetermined quantity of neutron absorbing material positioned in the vicinity of said detector, said neutron absorbing material being characterized by the emission of radiation to which the detector is sensitive in response to the capture of a neutron, said detector being substantially unshielded with respect to said radiation emitted from said neutron absorbing material such that said detector is exposed to at least a major portion of said radiation emitted from said neutron absorbing material and traveling toward said detector, whereby the first detecting unit is sensitive to both neutron-gamma radiation emitted from the formation and thermal neutron radiation emitted from the formation and captured by said neutron absorbing material so that the first detecting unit is rendered substantially insensitive to the presence of chlorine, a second radiation detecting unit positioned within said housing and being adapted to provide a quantitative signal of gamma radiation returning to the bore hole as a result of irradiation by neutrons from the source and which gamma rays are indicative of both the hydrogen and chlorine content of the formations.

5. Apparatus for conducting a radioactivity well log comprising an instrument housing adapted to be passed through a bore hole traversing a plurality of earth formations, said housing containing a source of fast neutrons, a first detecting unit quantitatively sensitive to gamma rays returning to the bore hole as a result of irradiation of the formation by neutrons from the source and which is adapted and arranged to provide an output signal primarily indicative of the presence of hydrogen in said formation, said first detecting unit comprising a detector of gamma rays which may result from irradiation of an earth formation by neutrons from the source, said detector having a thin sleeve surrounding at least a portion of its active volume, said sleeve being formed of a predetermined quantity of neutron absorbing material characterized by the emission of gamma radiation in response to the capture of a neutron, the quantity of said absorbing material being chosen in relation to the neutron source and detector such that the radiation emitted thereby in response to neutron interaction renders the first detecting unit substantially insensitive to the presence of chlorine, a second radiation detecting unit positioned within said housing and being adapted to provide a quantitative signal of gamma radiation returning to the bore hole as a result of irradiation by neutrons from the source and which gamma rays are indicative of both the hydrogen and chlorine content of the formations.

6. Apparatus for conducting a radioactivity well log comprising an elongated instrument housing formed of ferrous metal and adapted to be passed through a bore hole traversing a plurality of earth formations, said housing containing a source of fast neutrons, a first radiation detecting unit quantitatively sensitive to gamma rays returning to the bore hole as a result of irradiation of the formation by neutrons from the source and which is adapted and arranged to provide an output signal primarily indicative of the presence of hydrogen in said formation, said first detecting unit comprising a detector of gamma rays having positioned in the vicinity thereof a predetermined quantity of a first neutron absorbing material characterized by the emission of radiation to which the detector is sensitive in response to the capture of a neutron, whereby the detector unit is rendered substantially insensitive to the presence of chlorine, a second radiation detecting unit positioned within said housing and being adapted to provide a quantitative signal of gamma radiation returning to the bore hole as a result of irradiation by neutrons from the source and which gramma rays are indicative of both the hydrogen and chlorine content of the formations, and a layer of a second neutron absorbing material substantially surrounding the portion of the instrument housing in the vicinity of said second radiation detection unit, said second neutron absorbing material having a relatively insignificant gamma ray emission characterization in response to absorption of a neutron.

7. Apparatus for conducting a radioactivity well log comprising an elongated instrument housing formed of ferrous metal and adapted to be passed through a bore hole traversing a plurality of earth formations, said housing containing a source of fast neutrons, a first radiation detecting unit quantitatively sensitive to gamma rays returning to the bore hole as a result of irradiation of the formation by neutrons from the source and which is adapted and arranged to provide an output signal primarily indicative of the presence of hydrogen in said formation, said first detecting unit comprising a detector of gamma rays which may result from irradiation of an earth formation by neutrons from the source, said detector having a thin sleeve surrounding at least a portion of its active volume, said sleeve being formed of a predetermined quantity of a first neutron absorbing material characterized by the emission of gamma rays in response to the capture of a neutron, the quantity of said first neutron absorbing material being chosen in relation to the neutron source and detector spacing such that the radiation emitted thereby in response to neutron interaction renders the first detecting unit substantially insensitive to the presence of chlorine, a second radiation detecting unit positioned within said housing and being adapted to provide a quantitative signal of gamma radiation returning to the bore hole as a result of irradiation by neutrons from the source and which gamma rays are indicative of both the hydrogen and chlorine content of the formations, and a layer of a second neutron absorbing material substantially surrounding the portion of the instrument housing in the vicinity of said second radiation detection unit, said second neutron absorbing material having a relatively insignificant gamma ray emission characterization in response to absorption of a neutron.

8. Apparatus according to claim 4 further comprising means for continuously urging a side of the logging instrument against the side of the bore hole as the instrument is passed through a bore hole for conducting a well log thereof.

9. Apparatus according to claim 6 further comprising means for continuously urging a side of the logging instrument against the side of the bore hole as the instrument is passed through a bore hole for conducting a well log thereof.

10. Apparatus for conducting a radioactivity well log comprising an instrument housing adapted to be passed through a bore hole traversing a plurality of earth formations, said housing containing a source of neutrons, a first detecting unit quantitatively sensitive to the gamma rays returning to the bore hole as a result of irradiation of the formation by neutrons from the source and which is adapted and arranged to provide an output signal primarily indicative of the presence of hydrogen in said formation, said first detecting unit comprising a gamma radiation detector and a predetermined quantity of neutron absorbing material positioned in the vicinity of said detector, said neutron absorbing material being characterized by the emission of radiation to which the detector is sensitive in response to the capture of a neutron, said detctor being substantially unshielded with respect to said radiation emitted from said neutron absorbing material such that said detector is exposed to at least a major portion of said radiation emitted from said neutron absorbing material and traveling toward said detector whereby the first detecting unit is sensitive to both neutron-gamma radiation emitted from the formation and thermal neutron radiation emitted from the formation and captured by said neutron absorbing material so that the first detecting unit is rendered substantially insensitive to the presence of chlorine, a second radiation detecting unit positioned within said housing and being adapted to provide a quantitative signal of radiation returning to the bore hole as a result of irradiation by neutrons from the source and which radiation is indicative of both the hydrogen and chlorine content of the formations.

11. In a radioactivity well logging of earth formations traversed by a bore hold involving passing a source of neutrons through the bore hole to irradiate the formations along the bore hole and detecting radiation in the borehole which is emitted from the formations as a result of said irradiation and providing a signal display proportional thereto, the improvement wherein radiation primarily indicative of both chlorine and hydrogen is selectively detected to provide a first signal and wherein radiation comprising the combination of a neutron-gamma component and a thermal neutron component occurring in the borehole as a result of said irradiation whereby said radiation is primarily indicative of hydrogen to the substantial exclusion of chlorine is also selectively detected to provide a second signal and wherein said two signals are plotted in correlation with the position of the detected radiation in the bore hole in such manner that differences between the two signals provide a quantitative measure of the chlorine content of the formation and corresponding variations in the two signals provide a quantitative indication of the hydrogen content in the formation.

12. The method of claim 11 wherein said first signal results from the detection of radiation consisting essentially of neutron-induced gamma radiation resulting from irradiation by said neutrons and wherein said first signal is substantially free of the influence due to the detection of thermal neutrons.

13. Apparatus for conducting a radioactivity well log comprising an instrument housing adapted to be passed through a bore hole traversing a plurality of earth formations, said housing containing a source of fast neutrons, a first detecting unit quantitatively sensitive to gamma rays returning to the bore hole as a result of irradiation of the formation by neutrons from the source and which is adapted and arranged to provide an output signal primarily indicative of the presence of hydrogen in said formation and substantially insensitive to the presence of chlorine, said first detecting unit comprising a gamma radiation detector and a predetermined quantity of neutron absorbing material positioned in the vicinity of said detector and characterized by the emission of radiation to which the detector is sensitive, said detector being substantially unshielded with respect to said radiation emitted from said neutron absorbing material such that said detector is exposed to at least a major portion of said radiation emitted from said neutron absorbing material and traveling toward said detector, whereby said detector is rendered sensitive to both neutron-gamma radiation and thermal neutron radiation in the borehole resulting from said irradiation of the formation by neutrons, a second radiation detecting unit positioned within said housing and being adapted to provide a quantitative signal which varies primarily as a function of the intensity of neutron-capture gamma radiation returning to the bore hole as a result of irradiation by neutrons from the source and which gamma rays are indicative of both the hydrogen and chlorine content of the formations.

14. In the radioactivity well logging of earth formations traversed by a bore hole involving passing a source of neutrons through the bore hole to irradiate the formations along the bore hole and detecting radiation in the borehole which is emitted from the formations as a result of said irradiation and providing a signal display proportional to the intensity thereof, the improvement wherein radiation primarily indicative of both chlorine and hydrogen is selectively detected to provide a first signal and wherein radiation comprising the combination of a neutron gamma component and a thermal neutron component occurring in the borehole as a result of said irradiation whereby said radiation is primarily indicative of hydrogen to the substantial exclusion of chlorine is also selectively detected to provide a second signal and wherein said two signals are plotted in correlation with the position of the detected radiation in the bore hole in such manner that relative values of the two signals provide a quantitative measure of the chlorine content of the formation and provide a quantitative indication of the hydrogen content in the formation.

15. Method of claim 14, wherein said first and second signals are provided by passing separate radiation detectors through the borehole to detect the radiations for providing said first and second signals.

16. In a system for conducting a radioactivity well log comprising a logging instrument adapted to be passed through a borehole traversing a plurality of earth formations, said instrument including means comprising a source of neutrons for irradiating earth formations along the traverse of a borehole, radiation detecting means quantitatively sensitive to the intensity of radiations occurring in the borehole as a result of the irradiation of the earth formations by neutrons from said source, said detecting means including first means for deriving a first signal which varies as a function of radiation resulting from said irradiation and which varies primarily due to the presence of hydrogen to the substantial exclusion of the influence of chlorine which may also be present, said first means comprising means for selectively detecting the combination of a first radiation component resulting from said irradiation which varies in intensity due to the presence of both hydrogen and chlorine together with a predetermined quantity of a second radiation component resulting from said irradiation which varies in intensity inversely with the variations of said first radiation component due to the presence of chlorine, and second means for deriving a second signal which varies as a function of radiation resulting from said irradiation and which varies due to the presence of both hydrogen and chlorine, said second means comprising means for selectively detecting radiation resulting from said irradiation which varies in intensity due to the presence of both hydrogen and chlorine, means operatively coupled to said first means for providing a signal indication which varies as a function of the combination of said first and second radiation components detected thereby and which varies primarily due to the presence of hydrogen to the substantial exclusion of the influence of chlorine which may also be present, and means operatively coupled to said second means for providing a signal indication which varies as a function of the intensity of the radiation detected thereby which varies due to the presence of both hydrogen and chlorine.

17. Apparatus as defined in claim 16 wherein said first means for selectively detecting the combination of a first radiation component together with a predetermined quantity of a second radiation component comprises means for selectively detecting a first radiation component consisting essentially of neutron-induced gamma radiation together with a predetermined quantity of a second radiation component consisting essentially of thermal neutron radiation.

18. Apparatus as defined in claim 16 wherein said first means for selectively detecting the combination of a first radiation component together with a predetermined quantity of a second radiation component comprises a first detecting unit selectively responsive to the combination of a neutron-gamma component and a predetermined quantity of a thermal neutron component and wherein said second means for deriving said second signal comprises a second detecting unit selectively responsive to gamma radiation to the substantial exclusion of thermal neutrons.

(References on following page)

References Cited by the Examiner

UNITED STATES PATENTS

| | | | |
|---|---|---|---|
| Re. 24,383 | 10/1957 | McKay | 250—71.5 |
| 2,469,461 | 5/1949 | Russell | 250—83.6 |
| 2,782,318 | 2/1957 | Herzog | 250—71.5 |
| 2,862,106 | 11/1958 | Scherbatskoy | 250—71.5 |
| 2,910,591 | 10/1959 | Baker | 250—71.5 |
| 2,933,609 | 4/1960 | Norelius | 250—83.6 |

RALPH G. NILSON, *Primary Examiner.*

ARTHUR GAUSS, *Examiner.*